United States Patent [19]

Manueco Santurtun et al.

[11] Patent Number: 4,758,770

[45] Date of Patent: Jul. 19, 1988

[54] SERVOSYSTEM FOR CONTROLLING THE VOLTAGE IN X-RAY GENERATORS

[75] Inventors: Carlos Manueco Santurtun; Miguel A. Ruiz Corral, both of Madrid, Spain

[73] Assignee: General Espanola de Electromedicina S.A., Madrid, Spain

[21] Appl. No.: 375,094

[22] Filed: May 5, 1982

[30] Foreign Application Priority Data

May 14, 1981 [ES] Spain .................................... 502248

[51] Int. Cl.[4] .......................... G05B 1/06; H05G 1/32

[52] U.S. Cl. ..................................... 318/666; 378/112

[58] Field of Search ................ 378/112; 318/780, 665, 318/685, 331, 666, 251, 345 B, 345 F, 611, 367, 369

[56] References Cited

U.S. PATENT DOCUMENTS

| | | | |
|---|---|---|---|
| 3,176,136 | 3/1965 | Hopkinson | 378/112 X |
| 3,325,645 | 6/1967 | Splain | 378/112 X |
| 3,441,823 | 4/1969 | Schlabad | 318/345 B X |
| 3,855,511 | 12/1974 | Smith | 318/345 B X |
| 4,250,435 | 2/1981 | Alley | 318/254 X |
| 4,338,551 | 7/1982 | Mizumoto | 318/254 |
| 4,366,575 | 12/1982 | Bax | 378/112 X |
| 4,435,673 | 3/1984 | Hagino | 318/254 |

*Primary Examiner*—William M. Shoop, Jr.
*Assistant Examiner*—Patrick C. Keane
*Attorney, Agent, or Firm*—Wenderoth, Lind & Ponack

[57] ABSTRACT

A servosystem for controlling the voltage in X-ray generators includes a system for controlling the voltage of the primary of a high voltage transformer for feeding the X-ray tubes. A servosystem controls the position and adjustment of acceleration, uniform movement and braking, and supplies a direct current motor, of the permanent magnet type and of standard manufacture, which moves the brushes of a three-phase or monophase toroidal autotransformer, the operation of which fixes the primary voltage of the high voltage transformer which, in turn, supplies a voltage to an X-ray tube.

7 Claims, 3 Drawing Sheets

SERVOSYSTEM FOR CONTROLLING THE VOLTAGE IN X-RAY GENERATORS

BACKGROUND OF THE INVENTION

The present invention refers to a system for controlling and adjusting the voltage acting on a direct current motor with the purpose of positioning a variable autotransformer and obtaining at the brushes thereof the desired output voltage. This alternating current voltage is used to obtain a high voltage, by means of a high-voltage transformer, which is applied to an X-ray tube, to obtain a radiation which is displayed on a screen or a radiographic plate to carry out a clinical study of a patient.

The system for controlling and adjusting the voltage acts on a direct current motor which is fed with positive and negative voltages, depending on the direction of turn and the braking sequence thereof.

The invention controls, with a first closed loop, the output voltage of the brushes of a variable autotransformer. The required voltage is compared with the output voltage of the brushes after the output voltage is detected and rectified, and the result of this comparison constitutes the error signal of the voltage loop which, after being corrected and amplified, controls the correct position of the brushes of the variable autotransformer.

The system controls, with a second closed loop, the current of the motor which is equivalent to a control of the torque of the motor, wherefore there is no armature saturation effect, implying an automatic control of the three adjustment phases of the servosystem corresponding to acceleration time, uniform movement and braking.

The movement of the brushes of the variable autotransformer is a function of the required voltage demand which the operator fixes in the control system of the X-ray generator and the positioning thereof takes place in a vacuum without the passages of intensity, prior to the exposure of X-rays and during a time in which an automatic compensation of the network voltage is permitted.

Typically, conventional systems for controlling the voltage in X-ray systems use positioning transducers, indirectly measuring the output voltage of the variable autotransformer. These methods are affected by the mechanical tolerances and the roughness of the autotransformers, which are not linear and are difficult to compensate.

The positioning transducer itself introduces errors in the system, due to the non-linearity and the tolerances in the accuracy of the measurement. It does not automatically compensate for the shifts in the network voltage, wherefore a stabilizer should be installed at the input of the network.

The control of the motor by a continuous or transitional speed feedback which, in short, is a control of the armature voltage of the motor, increases the time constant of the system, since it depends on the electrical and mechanical constant of the motor. This consequence is very important from the point of view of a dynamic response of the servosystem, with respect to acceleration as well as to braking. See Appendix I (Calculation of the transfer function of a direct current motor fed by voltage or by current control).

On the other hand, the open loop control of the output voltage of the variable autotransformer requires a considerable number of adjustments and supplementary circuits to obtain the desired output voltage.

SUMMARY OF THE INVENTION

Accordingly, the objects of the present invention reside in proportioning a control system having the following characteristics:

The primary voltage variation is typically in the range of from 24 kVp to 150 kVp (referring to high voltage), i.e. a 7:1 range approximately, and the accuracy obtained in the primary of the voltage transformer is approximately in the range of 1%. The movement of the brushes takes place by means of a direct current motor securely coupled to the shaft of the toroidal autotransformer. This direct current motor is of the permanent magnet type, and is designed to effect rapid accelerations and braking without saturation due to armature reaction which could unstabilize the system; typically the ratio of the blocked rotor current to the nominal current is in the range of 30:1.

These objects and characteristics thereof are briefly summarized in the following points:

(a) To accelerate, brake and position in a predetermined time, less than that required to transfer the fluoroscopic system to a graphic system, typically of 0.8 seconds for a maximum range of 7:1 and using a direct current motor having a minimum nominal power to the basic speed.

(b) Sensitivity equal to or less than 1 kVp referred to the high-voltage side, which corresponds approximately to 1.6°/kVp throughout the path of the movable brushes.

(c) The control system should dynamically and statically have a gain capable of guaranteeing the obtaining of the values defined in the aforementioned apparatus defined in (a) and (b) when the friction torque varies in the ratio of 1.5:1, depending on the roughness and the quality of adjustment of the movable brushes with the toroidal surface.

(d) Accuracy in the range of 1% throughout the path of the toroidal autotransformer, when the friction torque varies in the maximum ratio of 1.5:1.

This system for controlling and adjusting the voltage in X-ray generators constitutes a novel starting point to simplify, reduce costs and increase the accuracy when compared with other conventional positioning systems having a multivariable control.

The most important advantages of this type of control, when compared with conventional systems which use positioning transducers, such as potentiometers, etc., can be summarized as follows:

(a) Automatic compensation for the variable to be controlled, for example, minimization of errors.

(b) Automatic compensation for the roughness and mechanical tolerances which are, on the other hand, difficult to compensate in a positioning transducer system.

(c) Elimination of the non-linearity of the transducer.

(d) Compensation for the non-uniformity of the surface of the toroidal autotransformer, which are difficult to compensate with a positioning transducer system.

(e) Considerable contribution to the reliability of the system, compared with that incorporating conventional equipment where the indirect measurement of position can produce a discrepancy between the voltage or parameter to be controlled and the indirect feedback signal, for example, when there are mechanical clearances in the shaft of the autotransformer or positioning potentiometer.

(f) The use of current injection control, such as that from which there is derived that of controlling the current as a limitation, particularly from the point of view of protecting the transistor power amplifier during acceleration, braking and possible blocking of the motor.

Thus, diverse accelerations with a circular path in the range of 200° in less than 0.75 seconds in both directions can be made.

According to the above, this system allows a considerable simplification with respect to conventional systems, since it does not require adjustments nor revisions due to problems which can be produced from the interaction between the feedback variables thereof, optimization of the stability, etc.

On the other hand, it allows a considerable simplification of the electronic circuits in the range of 50%, a 40% reduction in the cost of materials, hand labor and adjustments, as well as an increase in the accuracy in the range of 30% with respect to other conventional positioning systems having a multivariable control.

This system can be used in any type of electric voltage control by means of direct current servomotors, which can operate any type of transformer having movable brushes, in applications such as voltage stabilizers.

DESCRIPTION OF THE PREFERRED EMBODIMENT

Figure 1:
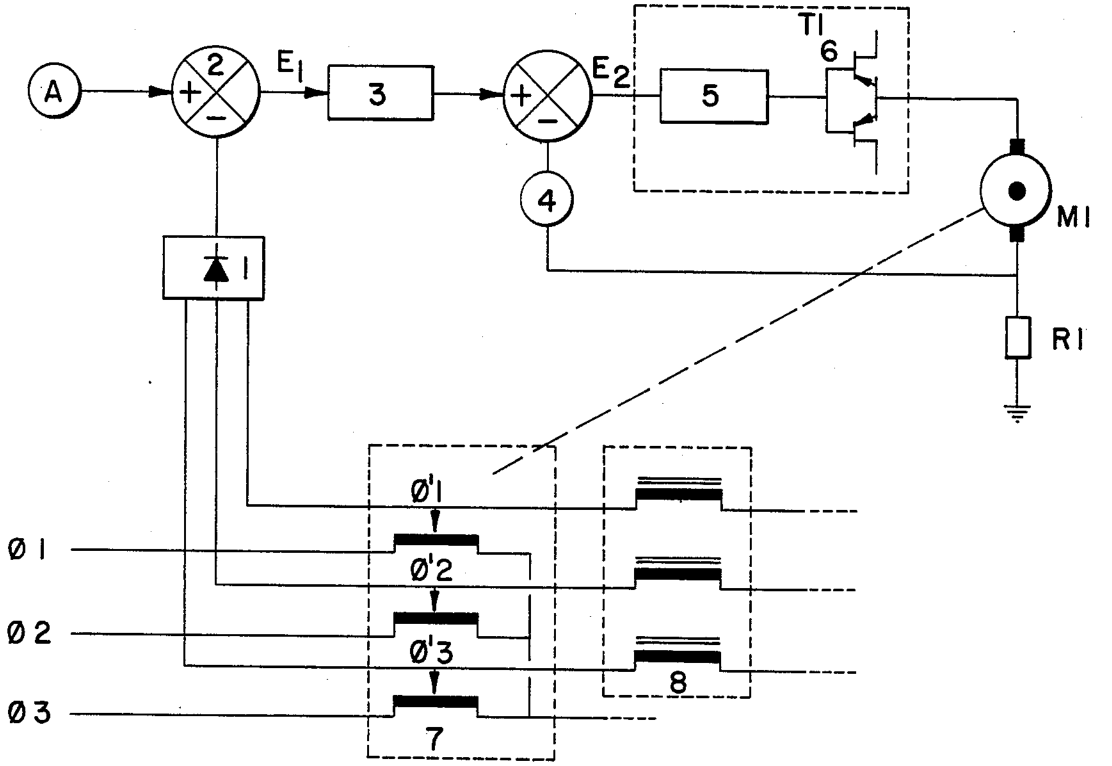
FIG. 1 is a block diagram of a servosystem for controlling the voltage in an X-ray generator, illustrating the basic steps of this system.

The servosystem for controlling and adjusting the voltage is comprised of the following main elements, in accordance with the block diagram of FIG. 1.

1. Voltage feedback transducer
2. Voltage error detector
3. Amplifier, phase lead and dynamic compensation of the error
4. Signal current feedback transducer
5. Current error amplifier
6. Power amplifier
7. Variable autotransformer.

1. Voltage feedback transducer

This circuit picks up the alternating current voltage at the output of the brushes of the variable autotransformer, converts it to direct current voltage at a maximum level of 10 volts and uses it as a feedback in the first closed voltage loop of the system.

Figure 2:
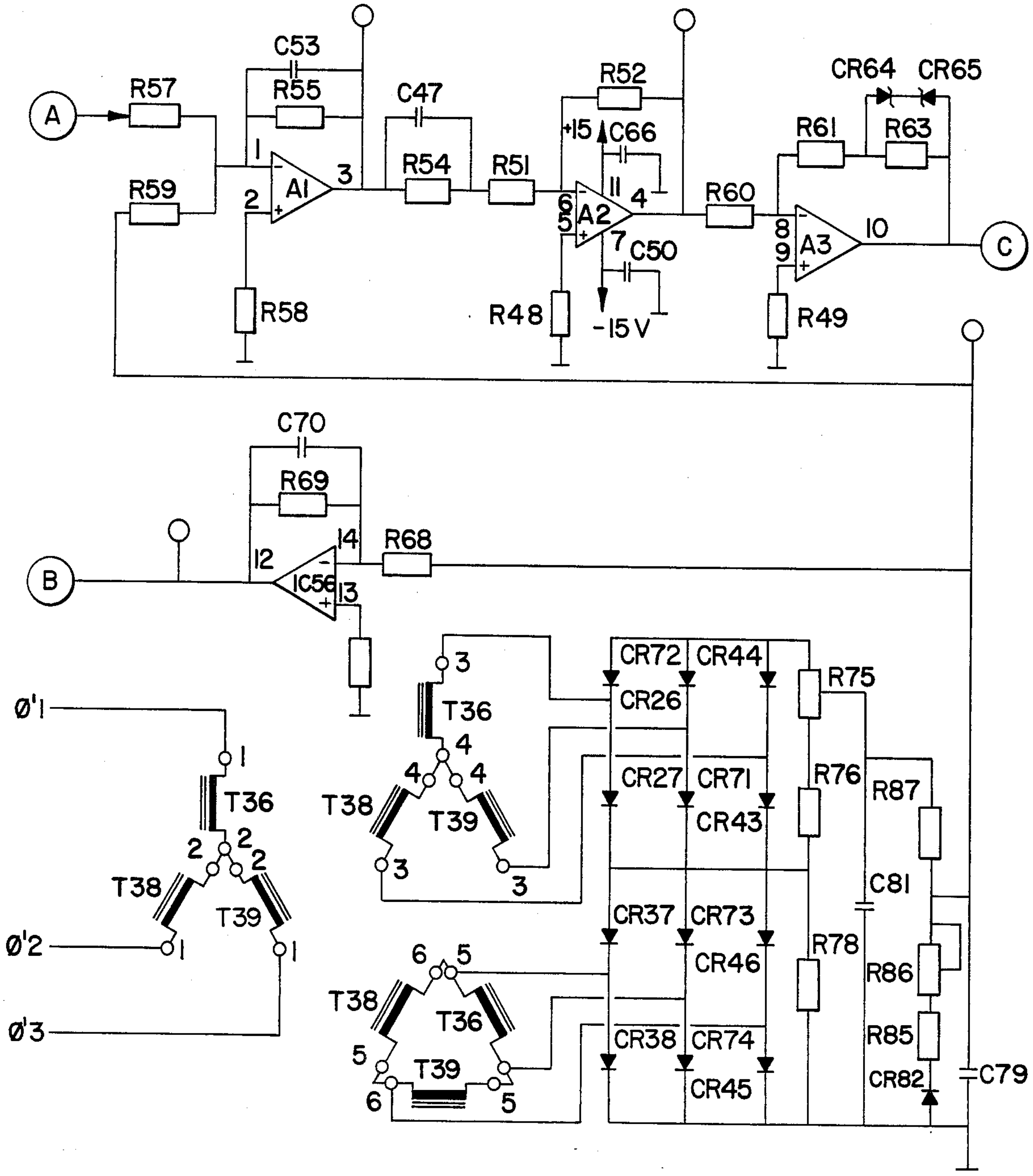
FIG. 2 is a simplified diagram of the error detection step and the feedback system of the first closed voltage loop.
Figure 5:
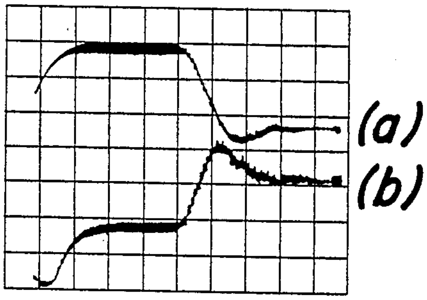
FIG. 5 is the waveform of the voltage and the current applied to the direct current motor.
Figure 6A:
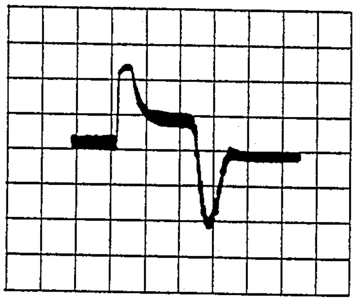
FIGS. 6 to 6c are waveforms of the current of the motor for the different movements of the brushes of the variable autotransformer.

This circuit is illustrated in detail in FIG. 2.

It consists of three single-phase transformers (T36, T38, T39), the primaries being Y-connected and the terminals ϕ1, ϕ2 and ϕ3 being connected to the brushes of the variable autotransformer. One of the two secondary windings of each transformer is Y-connected and the other is delta-connected.

These six outputs are connected to a twelve-phase rectifier, formed of the diodes CR26 to CR74, which are Graetz bridge connected, hexaphase individually and serially between both, to obtain a 12-phase voltage looping whose main purpose is that of attenuating this looping with the least time constant.

The output of the assembly of both rectifiers is added to the suitable ratio of transformation of both secondaries ($\sqrt{3}$) to obtain the same looping level and voltage in the two hexaphase rectifications.

The variable resistor R75 permits voltage level shifts of both secondaries to be adjusted, which can be due to flaws in the manufacture of the secondary windings.

The diode CR82 is used to attenuate the voltage shifts produced by the variation in temperature of the diodes of the twelve-phase rectifier.

The time constant defined by the resistor R75 (500 Ω) and the capacitor C81 (0.33 μf) is approximately of 0.2 milliseconds; the main object of this filter being that of minimizing the high frequency noise.

The filter R87 (204 kΩ) and C79 (2 μf), on the other hand, having a time constant of 5 milliseconds, has the object of attenuating the looping, the delay caused by this filter in minimal and represents 0.6% of the total acceleration time.

2. Voltage error detector

This circuit compares the demand signal (point A) with the feedback signal of the voltage loop and a signal is obtained at the output, which is the error or the difference between the two signals. This circuit is illustrated in FIG. 2.

The demand of volts at the output, at the terminal of the resistor R57 (point A) and the feedback signal of the voltage loop is applied to the resistor R59. At the same time, this signal is applied across the operational amplifier IC 56 to obtain a signal (point B) which can be compared with the demand signal (point A) to verify if the variable autotransformer has been correctly positioned within the permitted tolerance margin.

3. Amplifier, phase lead and dynamic compensation of the error

The function of this circuit is to amplify the error signal of the preceding step, to produce a phase lead of the signal to compensate for the delay produced by the movement of the motor and the other mechanical operations and electric filters. This circuit is illustrated in figure 2.

The phase lead and dynamic compensation of the error takes place in conjunction with the second and third amplifiers A 2 and Δ3; it is comprised of the resistor R54 (150 KΩ) in parallel with the capacitor C47 (0.47 μf) which are together in series with the resistor R51 (51 KΩ), as a result of the practical optimization in conjunction with a stability analysis of the system.

The dynamic compensation of the error circuit 3 in signals having a wide amplitude is improved by using the diodes CR64-CR65, whose object is to reduce the gain of the system for voltage error signals having a high value and to increase the gain in error signals having a small magnitude, particularly to improve the response to braking.

Point C of this circuit serves as a demand in the second closed current loop.

4. Current error transducer

Figure 3:
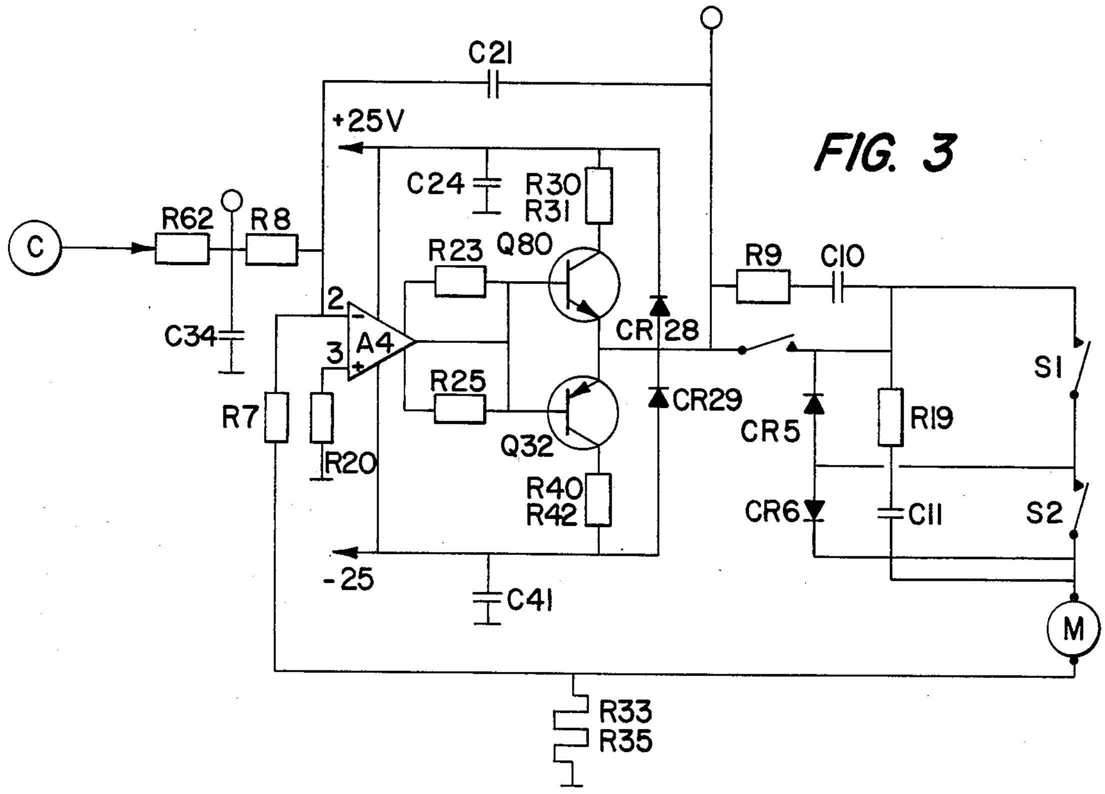
FIG. 3 is a simplified diagram of the power step which supplies the direct current motor and the second closed current loop.

FIG. 3 illustrates this circuit which is comprised of the shunt R33 and R35, consisting of two parallel resistors of 0.2Ω each, which are anti-inductive and serially arranged with the motor M, and the feedback resistor R7 which acts on the current error amplifier.

5. Current error amplifier A4 (see FIG. 3)

This compares the amplified and corrected voltage error signal with the current feedback signal of the motor, so that the current error signal acts on the power amplifier.

The error amplifier A4 is likewise protected against excess currents and short-circuits by means of two resistors R23–R25 (0.8Ω) which limit the intensity thereof at a permissible value, under any condition of saturation or damage of the transistors Q80–Q32.

6. Power amplifier

This is formed of the transistors Q80–Q32, class A configuration, which feed the direct current motor in both directions depending on the polarity of the error signal of the voltage loop. See FIG. 3.

The system is protected against dynamic excess currents and short-circuits by the following protections:

A current loop which acts, limiting the current. The absence of phase delays permits a very rapid response to speed which prevents the transistors of the power amplifier Q80–Q32 from by-passing their safe operating area.

The system for controlling and adjusting the voltage operates on a direct current motor (M) which is supplied with positive and negative voltages, depending on the direction thereof and the sequence of braking thereof.

S1 and S2 are two switches limiting the left and right movement, serially arranged with the motor and which act by interrupting the current, when the brushes have by passed said limits.

7. Variable autotransformer

This is the instrument by means of which the desired variable voltage is obtained from a fixed network voltage.

The assembly is formed (in three-phase systems) of three toroidal autotransformers whose outputs, through brushes which move along the toroidal disc, are mechanically fixed to a shaft which is directly joined to the shaft of the direct current motor.

When the motor turns in any direction, the brushes turn therewith, obtaining at the output the desired voltage.

8. High-voltage transformer

The output of the variable autotransformer is applied to the primary of the high-voltage transformer with the purpose of transforming this low alternating current voltage to high voltage, and to be applied to the X-ray tube between the cathode and the anode.

The transformation ratio between the coils of the primary winding and the secondary proportions the desired high voltage level.

FIGS. 5, 6*a*, 6*b*, and 6*c* illustrate the results obtained with a servosystem for controlling the voltage in an X-ray generator.

During the accelerating process of the motor (see FIG. 5) the error signal of the servo voltage reaches, at the beginning, saturation levels until the counterelectromotive force of the motor increases and the current is reduced. This gradual reduction of the current and, therefore, of the torque of the motor is produced while the error signal of the voltage loop is attenuated, since the servomotor approaches its demand equilibrium position. According to FIG. 5, the input voltage to the motor (a) is of 10 volts/division and 0.1 seconds/division. The current (b) is of 2 amps/division.

At the moment whereat the voltage error signal inverts its polarity in a very small value, due to the inertia of movement, the intensity demand signal is inverted, the power amplifier triggers the complementary transistors and the intensity changes direction, wherefore the electromagnetic torque has a higher gradient since the voltage applied and the counterelectromotive force have the same polarity. The intensity becomes zero and the motor is stopped in a damping oscillation about the equilibrium point, as can be seen for different demands in FIGS. 6*a* to 6*c*.

Figure 4:
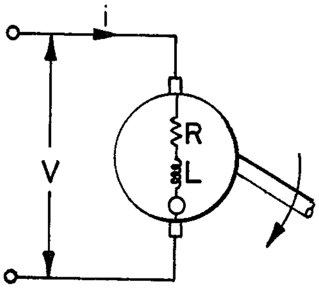
FIG. 4 illustrates a direct current motor considered from the point of view of its transfer function.
Figure 6B:
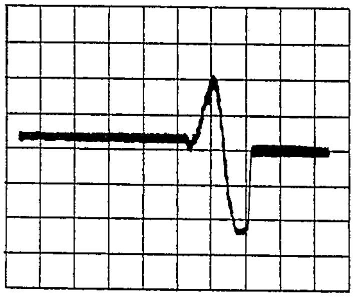
Figure 6C:
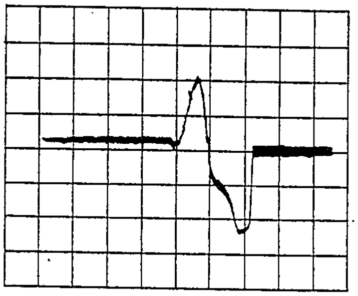

These three figures correspond to a change in demand from 50 kVp (peak kilovoltage) to 75, 100 and 150 kVp respectively. Amplitude of the current: 2 amps/division and time: 0.2 seconds/division. APPENDIX 1. Calculation of the transfer function of a direct current motor fed by a voltage control or current injection A direct current motor, considered from the point of view of its transfer function, comprises a counterelectromotive force proportional to the speed plus an inductor and a resistor in series, as indicated in FIG. 4.

Other parameters are the inertia moment J and the friction torque f. On the other hand, the electromagnetic torque is proportional to the armature current and the electromotive force with respect to the speed of the motor.

We shall refer to:

i=armature current (amps)
V=armature voltage (volts)
W=angular speed (rad/second)
E=counterelectromotive torque (volts)
V=voltage applied to the motor (volts)
f=friction coefficient Kg.$m^2$/second
J=moment of inertia (motor+operation) Kg.$m^2$
R=induced resistance (ohms)
L=induced inductance (henry)
T=electromagnetic torque (kg.m)
$K_T$=electromagnetic torque/current transfer (Kg.m/amps)
$K_r$=counterelectromotive force/angular speed transfer (volts/rad/seconds)

By applying the dynamic rotational equation in the complex plane S=jw, $$T-fw=Jsw \quad (1)$$

The ratio between the electromagnetic motor torque and the current of the armature is given by the following formula:

$$T=K_T i \quad (2)$$

The ratio between the counterelectromotive force and the angular speed is given by the following expression:

$$E=Kv\ W \quad (3)$$

Replacing the equation (2) and (3), we obtain:

$$K_T i-fw=Jsw \quad (4)$$

The ratio between the voltage applied to the armature and the counterelectromotive force is as follows:

$$i = \frac{V + E}{R + sL} \qquad (5)$$

Replacing (3) by (5), we obtain:

$$V = i(R + sL) - K_V \dot{W} \qquad (6)$$

At low speeds during the acceleration period, we can assume:

$$V = K_V W \qquad (7)$$

Therefore, the formula (6) is reduced to the following expression:

$$i = \frac{V}{R + sL} \qquad (8)$$

Replacing (8) by (4) and simplifying, we obtain:

$$\frac{W}{V} = \frac{K_T}{R \cdot f} \cdot \frac{1}{(1 + sL/r)(1 + sJ/f)} \qquad (9)$$

If the control takes place by current injection, we can obtain the formula (4)

$$\frac{W}{i} = \frac{K_T}{f + Js} = \frac{K_T}{f(1 + J/f \cdot s)} \qquad (10)$$

From the equations 9 and 10, it is deduced that the current injection system offers a more rapid speed of response than that of armature voltage, since in the first case the time constant of the system is reduced only to the electric constant of the motor.

In practice, the transfer function is more complex, due to the non-linearities of the resistant torque and to the inertia of the load (in this case negligible).

We claim:

1. A servosystem for controlling an AC voltage by controlling a D.C. motor which is mechanically connected to an autotransformer having at least one winding with a movable brush having said AC voltage appearing thereon, said servosystem comprising:

an input means for receiving an input demand request voltage;

a voltage feedback transducer which is electrically connected to said movable brush of said at least one winding of said autotransformer for converting said AC voltage into a corresponding DC output voltage;

a voltage error detector operatively electrically connected to said input means and said voltage transducer for generating a voltage error signal corresponding to the difference between said DC output voltage of said voltage feedback transducer and said input demand request voltage;

an amplifier and compensator means operatively electrically connected to said voltage error detector for amplifying and compensating said voltage error signal and for providing an output corresponding thereto;

a current feedback transducer for detecting a current flowing through said DC motor and for providing an output signal corresponding thereto;

a current error detector operatively electrically connected to said current feedback transducer and said amplifier and compensator means for generating an output signal corresponding to the difference between said output of said current feedback transducer and said output of said amplifier and compensator means;

a current error amplifier means operatively electrically connected to said current error detector and to said DC motor for amplifying said output signal from said current error detector and for driving said DC motor with said amplified signal;

wherein said servosystem has a first feedback loop which consists of said autotransformer, said voltage feedback transducer, said voltage error detector, said amplifier and compensating means, said current error detector, said current error amplifier means, and said DC motor;

wherein said servosystem has a second feedback loop which consists of said DC motor, said current transducer, said current error detector, and said current error amplifier means.

2. A servosystem as in claim 1, wherein said autotransformer has a plurality of windings and wherein said voltage feedback transducer combines a plurality of single phase transformers having primary windings which are connected to said movable brushes of said plurality of windings and having secondary windings which are connected to a plurality of full wave bridge rectifier circuits which are in turn connected to a resistor-capacitor filter whose output voltage is said DC output voltage.

3. A servosystem as in claim 1, wherein said voltage error detector comprises an operational amplifier.

4. A servosystem as in claim 1, wherein said amplifier and compensation means comprises a pair of series connected operational amplifiers having phase compensation means connected thereto and having a pair of back to back, series connected Zener diodes connected across one operational amplifier so as to reduce its gain for large signals which are input thereto.

5. A servosystem as in claim 1, wherein said current transducer comprises a resistor connected in series with said DC motor.

6. A servosystem as in claim 1, wherein said current error detector comprises an operational amplifier.

7. A servosystem as in claim 1, wherein said current error amplifier comprises a series connected common emitter complementary pair of transistors.

* * * * *